(12) United States Patent
Boone et al.

(10) Patent No.: US 8,998,144 B2
(45) Date of Patent: Apr. 7, 2015

(54) THERMAL INSULATION BARRIER FOR AN AIRCRAFT DE-ICING HEATER

(71) Applicant: Cessna Aircraft Company, Wichita, KS (US)

(72) Inventors: Richard Boone, Wichita, KS (US); John W. Gallman, Wichita, KS (US)

(73) Assignee: Textron Innovations Inc., Providence, RI (US)

(*) Notice: Subject to any disclaimer, the term of this patent is extended or adjusted under 35 U.S.C. 154(b) by 104 days.

(21) Appl. No.: 13/678,282

(22) Filed: Nov. 15, 2012

(65) Prior Publication Data
US 2014/0131520 A1 May 15, 2014

(51) Int. Cl.
*B64D 15/12* (2006.01)

(52) U.S. Cl.
CPC ...................................... *B64D 15/12* (2013.01)

(58) Field of Classification Search
USPC ....... 244/134 D, 134 A, 134 B, 134 C, 134 E, 244/134 R
See application file for complete search history.

(56) References Cited

U.S. PATENT DOCUMENTS

| | | | | |
|---|---|---|---|---|
| 2,297,540 A | * | 9/1942 | Driscoll | 244/134 D |
| 2,686,640 A | * | 8/1954 | Neel, Jr. et al. | 244/134 D |
| 3,791,906 A | * | 2/1974 | Farkas | 156/245 |
| 4,099,691 A | * | 7/1978 | Swanson et al. | 244/207 |
| 4,565,728 A | * | 1/1986 | Gray et al. | 428/200 |
| 4,603,824 A | * | 8/1986 | McArdel | 244/134 B |
| 4,894,569 A | * | 1/1990 | Lardiere et al. | 310/10 |
| 4,982,121 A | * | 1/1991 | Lardiere et al. | 310/10 |
| 5,011,098 A | * | 4/1991 | McLaren et al. | 244/134 B |
| 5,228,643 A | * | 7/1993 | Manda et al. | 244/134 B |
| 5,314,145 A | * | 5/1994 | Rauckhorst, III | 244/134 A |
| 5,344,696 A | * | 9/1994 | Hastings et al. | 428/220 |
| 5,489,073 A | * | 2/1996 | Leffel et al. | 244/134 R |
| 5,531,405 A | * | 7/1996 | Goldberg | 244/134 B |
| 5,558,304 A | * | 9/1996 | Adams | 244/134 A |
| 5,590,854 A | * | 1/1997 | Shatz | 244/206 |
| 5,807,454 A | * | 9/1998 | Kawabe et al. | 156/214 |
| 5,841,079 A | * | 11/1998 | Parente | 181/214 |
| 6,279,856 B1 | * | 8/2001 | Rutherford et al. | 244/134 E |
| 6,483,087 B2 | * | 11/2002 | Gardner et al. | 219/545 |
| 7,182,830 B2 | * | 2/2007 | Liang et al. | 156/292 |
| 7,681,838 B2 | * | 3/2010 | Layland et al. | 244/134 D |
| 8,181,900 B2 | * | 5/2012 | Chene et al. | 244/1 N |
| 8,383,997 B2 | * | 2/2013 | Keite-Telgenbuscher et al. | 219/546 |
| 8,496,770 B2 | * | 7/2013 | Kim | 156/89.12 |
| 8,523,113 B2 | * | 9/2013 | Atkinson | 244/134 D |
| 8,584,363 B2 | * | 11/2013 | Caruel | 29/897.2 |
| 8,714,489 B2 | * | 5/2014 | Bardwell | 244/134 D |
| 2007/0194179 A1 | * | 8/2007 | Giamati | 244/134 D |
| 2008/0029648 A1 | * | 2/2008 | Giamati | 244/134 D |
| 2009/0041996 A1 | * | 2/2009 | Boissy | 428/215 |
| 2010/0206990 A1 | * | 8/2010 | Petrenko | 244/134 D |
| 2011/0024568 A1 | * | 2/2011 | Bardwell | 244/134 D |
| 2013/0299637 A1 | * | 11/2013 | Hoffenberg | 244/134 A |
| 2014/0131520 A1 | * | 5/2014 | Boone et al. | 244/134 D |

* cited by examiner

*Primary Examiner* — Christopher P Ellis
*Assistant Examiner* — Medhat Badawi
(74) *Attorney, Agent, or Firm* — Lathrop & Gage LLP

(57) ABSTRACT

A structure for use with an electrothermal heating element is disclosed comprising a heating element contained in a mat and heater supports attached to one surface of the mat. The heating element is disposed between the skin and internal structure of an aircraft with the heater supports disposed toward the internal structure thereof. The heater supports maintain an insulating layer of air between the mat and the internal structure of the aircraft.

14 Claims, 6 Drawing Sheets

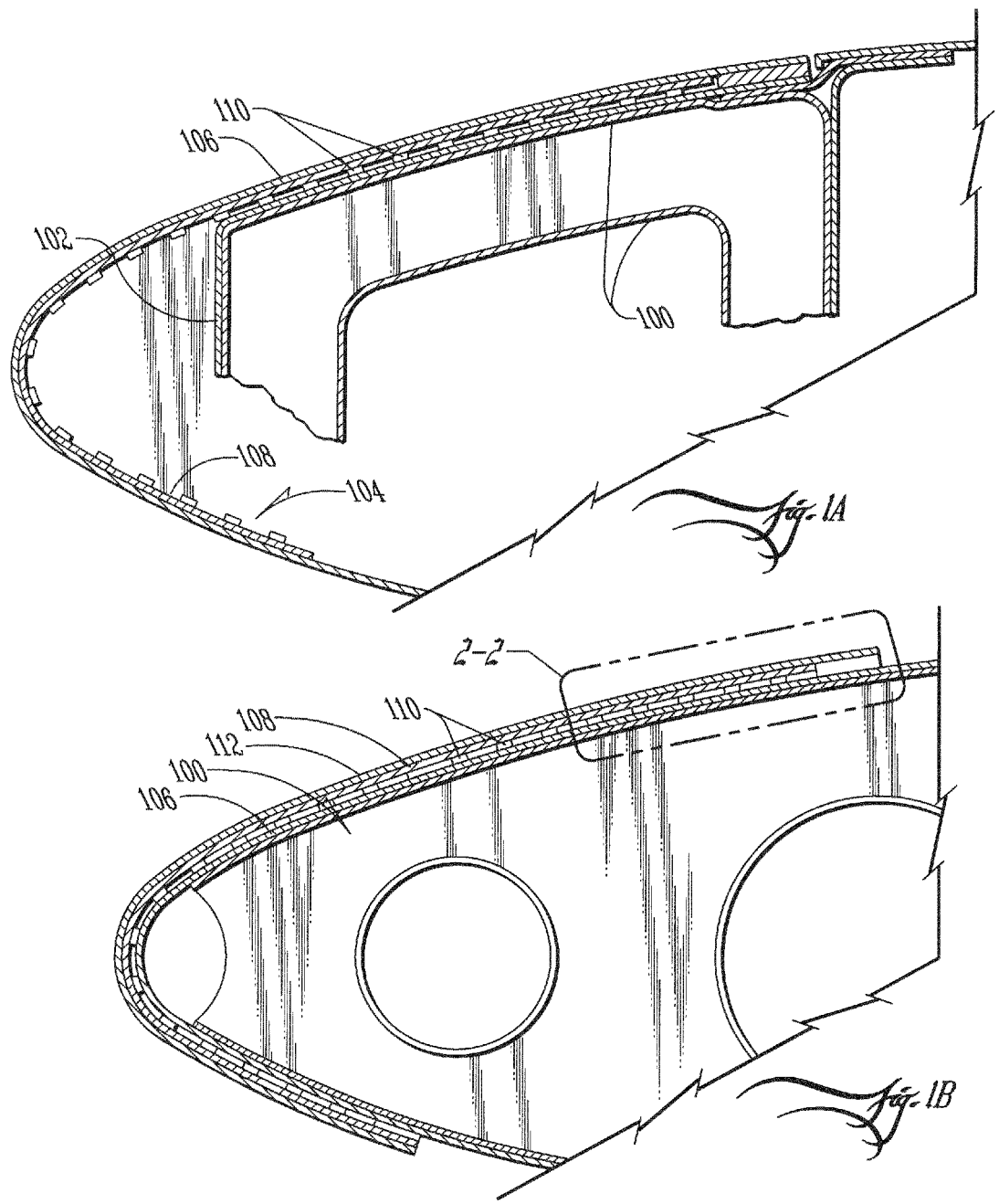

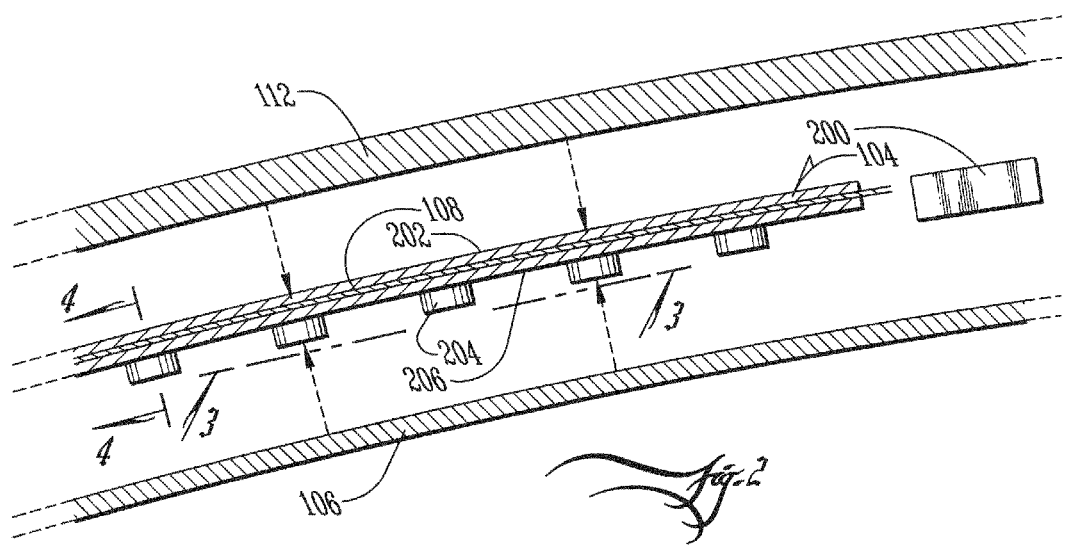
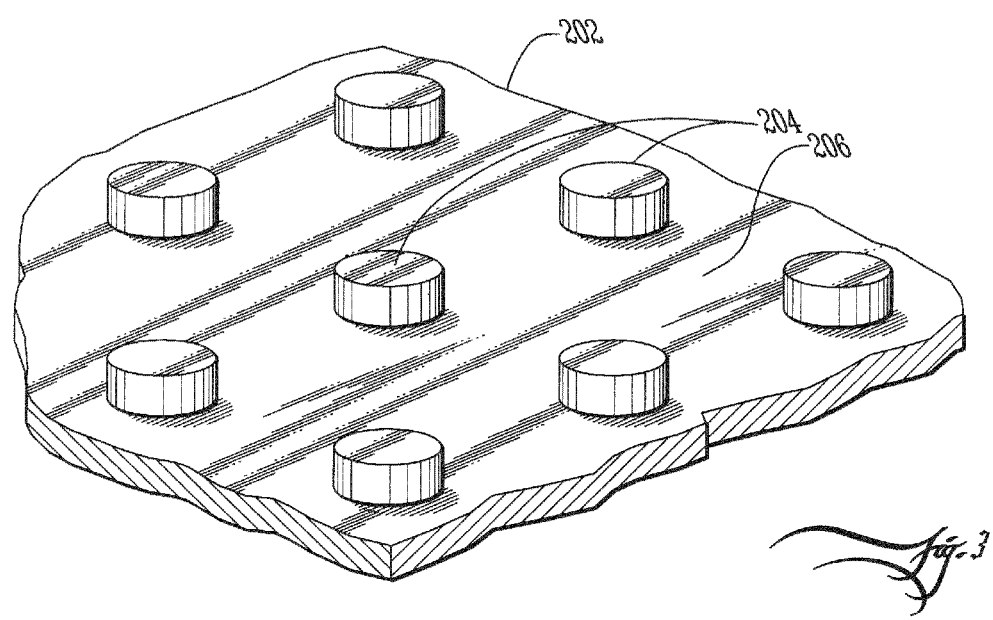

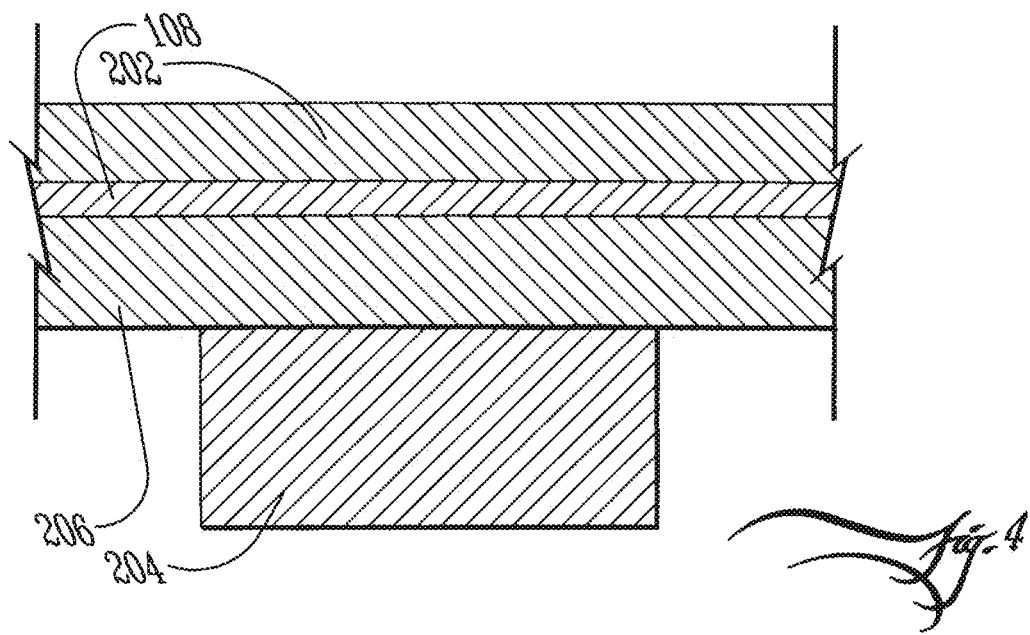

THERMAL INSULATION BARRIER FOR AN AIRCRAFT DE-ICING HEATER

CROSS-REFERENCE TO RELATED APPLICATIONS

This non-provisional application claims priority of U.S. Provisional Patent Application No. 61/595,452 filed on Feb. 6, 2012, which application is incorporated herein by reference.

BACKGROUND

1. Field of the Invention

The disclosed system relates to the field of de-icing systems for aircraft structures such as wing and tail surfaces. More specifically, the system relates to the field of using electrothermal heating elements for heating the surface of an aircraft to prevent or remove ice accumulation.

Some de-icing systems may utilize hot gases, known as bleed air, which is bled from engines to critical icing areas such as the leading edges of wings or the nose of the aircraft in the area of the windshield. There are several challenges to the use of bleed air, including, but not limited to, (i) loss of heat during piping of the bleed air to the area of concern, (ii) difficulty of applying direct heat to the area of concern without heating the entire adjacent airframe and internal components, and (iii) the ducting and control system is complex and takes space that could be used for other systems limiting it to larger aircraft.

Other de-icing systems utilize an inflatable boot attached to the external skin of the aircraft. The boots change shape when inflated and break the ice layer, which is then swept away by the airflow over the aircraft. They require maintenance over time and interrupt the airflow over the aircraft even when not in use.

Alternatively some aircraft are provided with systems for dispersing a liquid over the surface of the aircraft to prevent the formation or adherence of ice. The liquids are typically antifreeze solutions such as Glycol that coat the surface and prevent the adherence of ice to the surface. The liquids may be applied through pressurized holes in the leading edge of the wings. The system requires a tank of fluid that must be filled prior to flight, and the liquid creates cleaning issues after application.

An additional type of de-icing system utilizes electric heating to warm the areas of concern sufficient to prevent the formation of ice or to cause ice buildup to shed from the surface of the aircraft. The electricity is generated by the engine or an auxiliary power unit (APU) and the use of electric heating is typically limited by the available power that may be utilized to warm the heaters. As a result electric heating may not be practical for larger areas such as the leading edge of a wing, and may be limited to areas such as duct inlets, for example. The thermal insulation barrier described herein improves the efficiency of electric heating elements thus reducing the load on the engine or APU, and allowing electric heating to be utilized in a wider variety of applications.

2. Description of the Related Art

In many de-icing systems as described above, heating elements are provided adjacent to the skin of the aircraft at points susceptible to icing such as wing and tail surfaces. The heating elements may comprise heater mats that include electrothermal heating devices. The mats may be sandwiched between the skin of the aircraft and the internal structure of the aircraft. The heating elements generate thermal energy that is transferred to the skin of the aircraft for preventing the accumulation of ice.

Some of the thermal energy generated by the heating elements is transferred from the heating elements to the structure of the aircraft instead of to the skin of the aircraft. This thermal energy is transmitted through the internal structure of the aircraft and dissipated without contributing to the prevention of ice accumulation, thus reducing the efficiency and increasing the power requirements of the de-icing system. Various methods of insulating the heating elements from the internal structure of the aircraft have been utilized to reduce the dissipation of thermal energy in the internal structure of the aircraft.

Insulators such as glass beads, epoxy or other similar materials have been disposed between the heating element and the internal structure of the aircraft to reduce heat transfer from the heating element to the internal structure. These materials add weight, expense and complexity to the de-icing system. Such insulating layers also may trap moisture or condensation formed on the insulating layer within the aircraft skin.

The thermal insulation barrier described herein is an improved insulator to support the heating element and reduce thermal losses to the airframe of the aircraft.

SUMMARY OF THE INVENTION

The electrothermal heater is described for preventing, reducing or removing ice accumulation on the skin of an aircraft comprising an electrothermal heating element, a mat encasing the electrothermal heating element and having a first and second side, and a thermal insulating barrier attached to the first side of the mat; wherein the thermal insulating barrier comprises a plurality of support members.

In one embodiment, the thermal insulating barrier is disposed adjacent to the interior structure of an aircraft and the second side of the mat is disposed adjacent to the inner surface of an external skin of an aircraft.

In other embodiments, the electrothermal heater is disposed with the thermal insulating barrier disposed adjacent to the exterior surface of an exterior skin of an aircraft.

In some embodiments of the heater, the plurality of support members comprise a plurality of columns, sometimes with a polygonal or circular cross-section. In other embodiments, the plurality of support members comprise a plurality of ridges extending laterally across the mat or a plurality of pyramids.

The disclosure also discloses a structure for use in a de-icing system for an aircraft comprising an electrothermal heating element, a mat encasing the electrothermal heating element, a plurality of structures disposed on the mat between the electrothermal heating element and a portion of the skin of the aircraft; wherein the structures maintain a thermal barrier comprising a cavity of air between the electrothermal heating element and the skin of the aircraft.

In some embodiments the plurality of structures are substantially uniformly spaced and have substantially uniform heights ensuring a thermal barrier which has consistent heat resistance between the electrothermal heating element and the aircraft.

In some embodiments the structures are cylinders extending from the mat, and in other embodiments the structures are ridges extending laterally across the surface of the mat.

BRIEF DESCRIPTION OF THE DRAWINGS

FIG. 1A is a partial cross-sectional view of a wing of an aircraft incorporating an embodiment of the thermal insulation barrier.

FIG. 1B is a partial cross-sectional view of a wing of an aircraft incorporating an embodiment of the thermal insulation barrier.

FIG. 2 is a detail cross-sectional view of the surface of a wing of an aircraft incorporating an embodiment of the thermal insulation barrier.

FIG. 3 is a perspective view of an embodiment of the thermal insulation barrier.

FIG. 4 is a detail cross-sectional view of a portion of an embodiment of the thermal insulation barrier.

DETAILED DESCRIPTION

Figure 5:
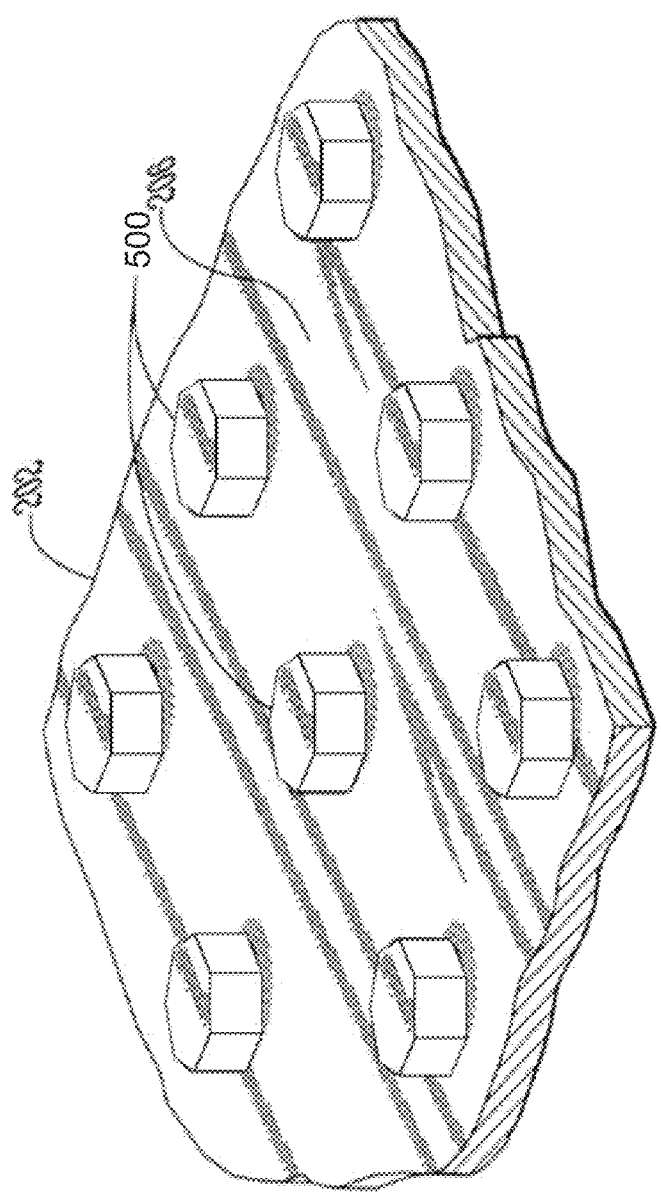
FIG. 5 is a perspective view of an alternative embodiment of the thermal insulation barrier.

Embodiments of the systems and methods described herein include the use of a heating element having a thermal barrier for directing heat transfer from the de-icing heating element toward the skin of an aircraft and away from the internal structure of the aircraft. The thermal barrier is formed by structures creating a layer of air between the heating element and the internal structure of the aircraft.

Alternative embodiments of the system described herein include a heating element with an outer heater skin on one side and a thermal barrier on the other side for attaching to the outside surface of the structural skin of an aircraft. The outer heater skin is non-structural and is designed for maintainability and finish. The heater skin may be formed from metal, plastic, composite materials, or a wide range of non-structural materials.

If the heating element 108 is in physical contact with either the internal structures 100, skin 102 in FIG. 1A or skin 106 in FIG. 1B, described in more detail below, heat transfer will typically occur from the heating element 108 to internal structures that do not need to be heated, in addition to the outer skin to be heated for ice prevention or removal. A certain portion of the thermal energy produced by the heating element 108 will be transferred to the skin 106 of the aircraft or heater skin layer 112 resulting in the prevention of ice accumulation and proper performance of the aircraft, however the inefficiency of the system will require more power from the aircraft power systems than would otherwise be necessary.

The inefficiency results because another portion of thermal energy will be transferred from the back of the heating element 108 into the internal structure 100 of the aircraft and away from the skin where ice accumulation is likely to occur. Since the internal structure 100 is often formed from metal or other thermally conductive materials, the internal structure 100 may act as a heat sink, rapidly conducting thermal energy away from the skin of the aircraft and dissipating it in the much larger internal structure. In such a scenario, a large portion of the thermal energy generated by the heating element may be lost to dissipation in the internal structure of the aircraft, greatly increasing the power requirements of the heating element required to meet safety regulations for de-icing systems and necessitating the use of more expensive electrothermal heating components.

Since the de-icing systems are required to meet certain levels of de-icing capability, thermal energy lost to the internal structure of the aircraft results in the selection of heating elements that produce more thermal energy than would otherwise be necessary. This in turn requires more power from the aircraft power systems than would be necessary in a more efficient design with a smaller heating element. Potential upgrades to aircraft power systems to meet de-icing demands also may increase the weight of an aircraft and thereby the cost of its operation. Similarly, increases in efficiency in the heating element may allow the reduction in size of aircraft power systems resulting in reduced weight and expense in the aircraft.

A number of designs have been utilized to reduce the transfer of thermal energy from the heating element 108 away from the aircraft skin. These designs often include heating elements 108 with a layer of thermally-insulating materials disposed between the active electrothermal heating element and the internal structure 100 of the aircraft. By slowing heat transfer in the direction of the internal structure 100, the addition of the insulating layer causes a higher percentage of the thermal energy generated by the heating element to flow to the aircraft skin for preventing ice accumulation.

Despite the improved efficiency and operation of the heating elements that incorporate the insulating layers, these materials add weight to the heating element, thus increasing the overall weight of the aircraft and increasing the cost of its operation. They also add complexity and expense to the manufacturing process. The improved heating element described herein addresses these limitations by utilizing air and an improved heating element design to reduce heat transfer from the heating element to the internal structure 100 of the aircraft. At the same time it is less complex to make and install, adds less to the weight of the aircraft, and allows the drainage of condensation and other liquid from the insulating layer.

Referring now to FIGS. 1A and 1B, partial cross-sectional views of a wing of an aircraft are depicted. The embodiments of the thermal insulation barrier shown in these Figures are incorporated into the wing; however the thermal insulation barrier described herein could also be incorporated into other aircraft structures susceptible to ice accumulation.

FIG. 1A depicts a partial cross-section of a wing, specifically the leading edge of the wing where ice accumulation is most severe and has the most undesirable consequences on aircraft performance. The thermal insulation barrier may be utilized on other areas of the aircraft in a similar manner to that shown here for the wing.

The wing has an internal airframe structure 100 comprised typically of ribs, spars and internal skin elements, although the internal structure of the wing is not part of or limiting of the thermal insulation barrier described herein. The wing structure may also include slats or other moving or extending structures on the leading edge of the wing not shown in the figures. The airframe structure 100 may be fully or partially covered by a internal skin 102. The internal structure 100 and skin 102 of the wing is often entirely or partially formed from metal or other materials susceptible to dissipation of heat applied to the skin of the aircraft.

The airframe of the aircraft also includes a structural skin 106. In the embodiment depicted in FIG. 1A, the heating element 104 is applied to the interior surface of skin 106 to provide heat to the skin 106 for heating it and shedding ice. The heating element 104 comprises an electrothermal heater 108, a thermal barrier 110 and a heater skin. The electrothermal heater 108 is separated from the internal structures 100 and 102 of the wing by thermal barrier 110. The thermal barrier 110 reduces heat transfer from the electrothermal heater 108 to the internal structures 100 and 102 of the airframe. A heater skin may be provided between the heating element 108 and the inside surface of skin 106.

FIG. 1B depicts a partial cross-section of a wing with a heating element 104 disposed on the outer surface of structural skin 106. In this embodiment the heating element is located outside the airframe of the aircraft.

In the embodiment depicted in FIG. 1B, the structural skin 106 of the aircraft, comprising part of the airframe, is disposed over the internal airframe structure 100. The heating element 104 comprises a heater skin layer 112, an electrothermal heating layer 108 and a thermal insulation barrier layer 110. The heater skin layer 112 does not provide structural support for the airframe but is designed for maintainability and finish. It may be formed from metal, plastic, composite materials or any similar material suitable for the application.

Referring now to FIG. 2, a detailed exploded cross-sectional view of an embodiment of the structure of a wing of an aircraft incorporating an embodiment of the thermal insulation barrier is depicted. The cross-sectional view is along the axis and in the direction specified by area 2-2 shown on FIG. 1B. The electrothermal heater 108 is disposed between and in contact with the heater skin 112 and the thermal barrier 110. The thermal barrier 110 separates the electrothermal heater 108 from the internal structure 100 and skin 106 of the airframe. The airframe of the aircraft, in this situation skin 106, supports the heating element 104. A single electrothermal heater 104 is depicted in FIG. 2, but in typical applications multiple electrothermal heaters 104 would be disposed on the internal structure 100, separated by filler strips 200.

Each heating element 104 comprises an electrothermal heating layer or element 108 which is encased in a protective mat, or covering, 202. The protective mat, or covering, comprises a first sheet 205 and a second sheet 206. A plurality of heater supports 204 are disposed on the inner surface, or sheet, 206 of the mat 202 for supporting the heating element 104 adjacent to the outer skin 112 and separating it from the internal structure 100 and skin 106. The area between mat 202 and skin 106 or internal structure 100 that is not filled by the supports 204 is filled with air. This layer of air and the supports 204 comprise thermal barrier 110. The heater supports 204 are sufficiently rigid and non-compressible to maintain a desired separation between the skin 106 or internal structure 100 and the heating element 108, and to support the areas of the heater skin 112 located directly adjacent to the heating elements 104.

The mats may be formed of any suitable material such as plastic, rubber, silicone, or similar materials. In an embodiment of the heating element, the heater skin and supports are formed from uncured silicone sheets which are then cured into the desired shape. The uncured silicone sheets may be formed into the desired shape with the supports by vacuum forming the sheet over a metal form. In one embodiment, the form may be a perforated metallic sheet that creates supports at each perforation.

Some embodiments may have a layer of an insulating material such as glass beads or epoxy adhered to the inner surface 206 of the mat 202 that creates an insulating layer between the heating element 104 and the internal structure 100. As previously mentioned, insulating layers of this type are not optimal for reasons of weight, cost and complexity. An alternative insulating layer is desirable for providing the insulating effect while avoiding extra weight and complexity.

The heater supports 204 described herein facilitate efficient heat transfer to the outer skin 102 while adding little weight, complexity or expense to the design of the aircraft. The volumes between the heating element, the heater supports and the internal structure of the aircraft define an air-filled insulating layer to reduce heat transfer to the internal structure of the aircraft. In embodiments, the air is trapped within the volumes, as reduced circulation will increase the insulating effect of the air layer.

The extra weight of the heater supports 204 is minimal and most of the volume of the insulating layer is composed of air and adds no weight to the aircraft. The air provides a good thermal insulator to reduce heat transfer in the direction of the internal structure 100. The air layer also provides a space for condensation and other liquids to drain down through the wing structure.

Referring now to FIG. 3, a perspective view of an embodiment of the thermal insulation barrier is depicted. In this embodiment, the heater supports are cylindrical, with a circular cross-section when viewed along an axis perpendicular to the surface of mat 202. Depending on the material used for the supports, the sizes and shapes of supports may vary in other embodiments of the thermal insulation barrier. Depending on the material used and the size of the supports, the separation between the supports may also vary in embodiments of the invention.

The thicknesses for the various layers may vary depending on the circumstances in which the heating element will be utilized and the materials utilized for each element. A thicker layer provides a greater barrier to heat transfer, but also takes more space in the aircraft that is necessary for the internal structure of the aircraft. Thinner sheets require less wattage in the heating element by allowing greater transfer to the skin of the aircraft, but would require more supports to provide adequate support to the heating element. Also increasing the radius of curvature of the skin creates a stiffer skin that requires fewer supports. As a result, the specific design of the supports and the thickness of the protective mat will depend on the application in which the heating element is utilized.

Referring now to FIG. 4, a detail cross-sectional view of a portion of an embodiment of the thermal insulation barrier is depicted. Specifically, the figure depicts the cross-section of a single heater support 204 and the protective mat 202. The electrothermal heater 108 and heater skin 112 are not depicted. In the depicted embodiment the support 204 is a solid cylinder of the mat material. In other embodiments the support may be hollow in the center, and may also be open on one or both ends.

Figure 6:
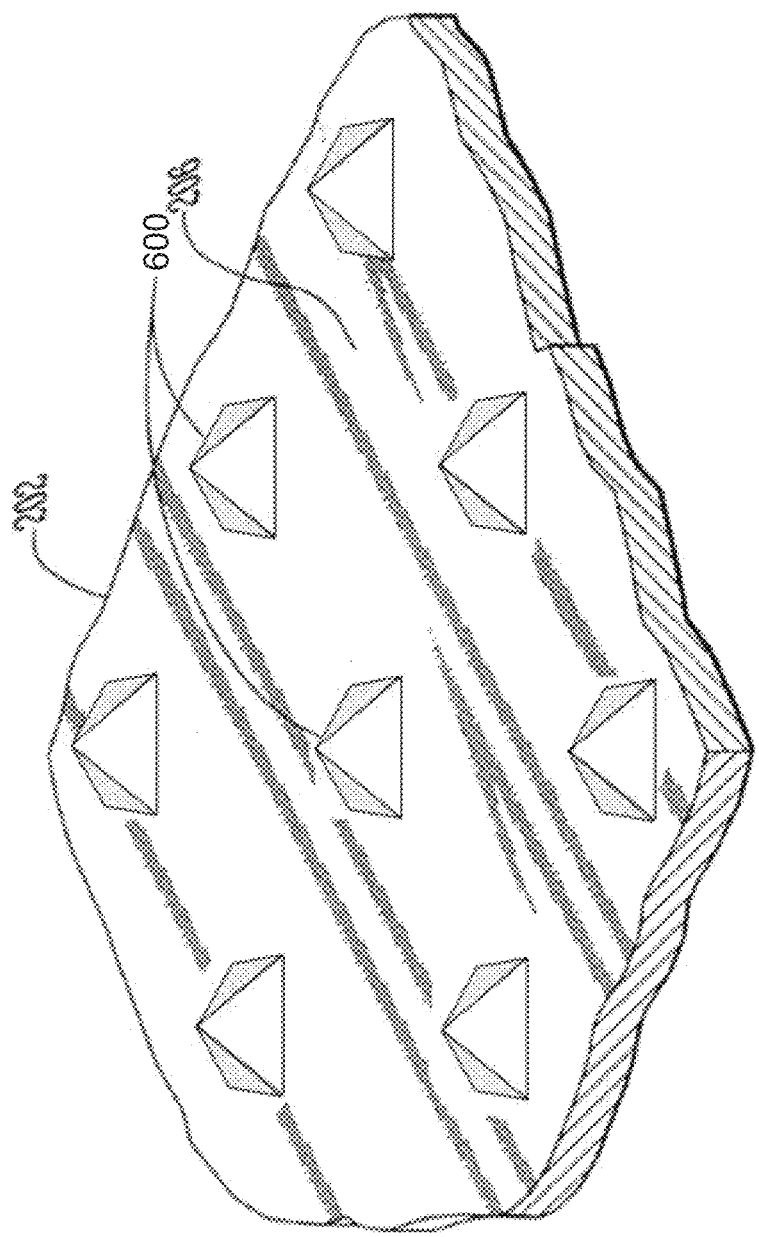
FIG. 6 is a perspective view of an alternative embodiment of the thermal insulation barrier.
Figure 7:
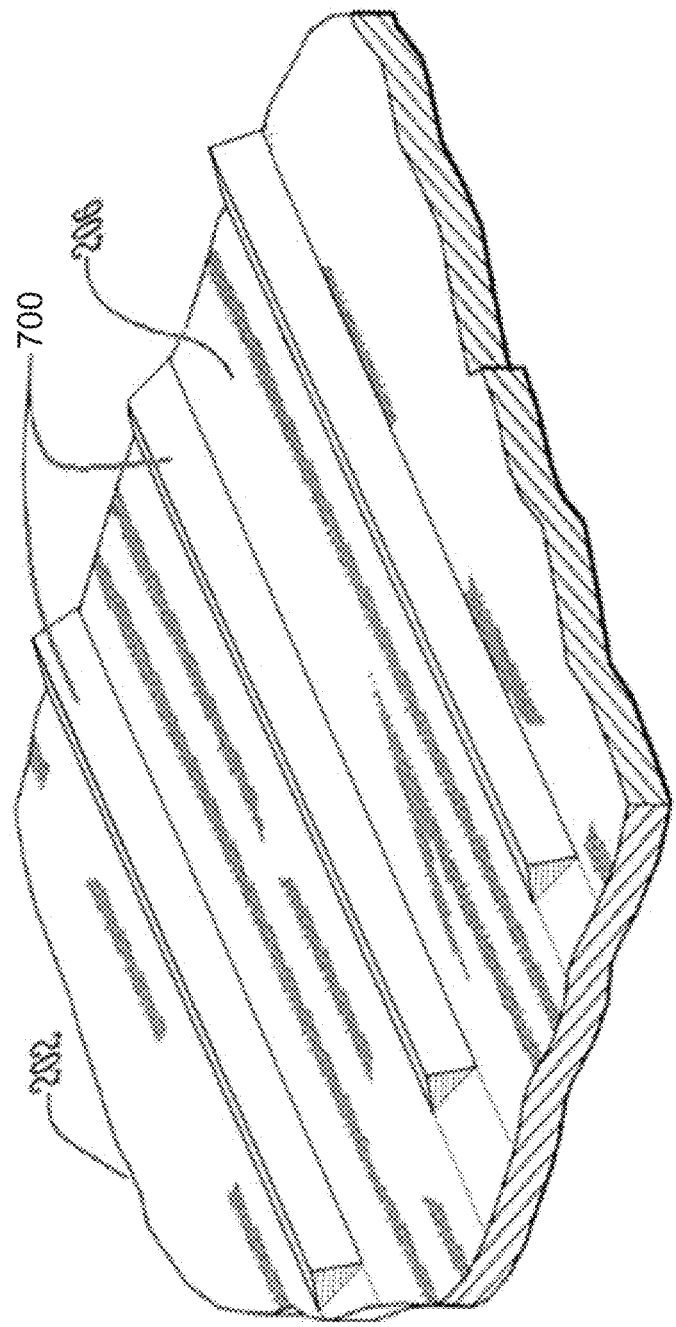
FIG. 7 is a perspective view of an alternative embodiment of the thermal insulation barrier.

In some embodiments of the heater, the plurality of support members comprise a plurality of columns, sometimes with a polygonal cross-section as shown in FIG. 5 or a circular cross-section as shown in FIG. 3. In other embodiments, the plurality of support members comprise a plurality of ridges extending laterally across the mat in FIG. 7 or a plurality of pyramids as shown in FIG. 6.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. An electrothermal heater for a skin of an aircraft, the electrothermal heater comprising:
    an electrothermal heating element;
    a mat encasing the electrothermal heating element, the mat comprising a first and a second sheet; and
    a thermal barrier attached to the second sheet of the mat;
    wherein the thermal barrier comprises a plurality of rigid support members for maintaining a layer of air between the second sheet and the aircraft.

2. The electrothermal heater of claim 1 wherein the thermal barrier is disposed adjacent to an internal structure of the aircraft and the first sheet of the mat is disposed adjacent to an inner surface of the skin of the aircraft.

3. The electrothermal heater of claim 1 wherein the electrothermal heater is disposed with the thermal barrier disposed adjacent to an exterior surface of the skin of the aircraft.

4. The electrothermal heater of claim 1 wherein the plurality of support members and the second sheet of the mat are formed from a single sheet of material.

5. The electrothermal heater of claim 1 wherein the plurality of support members comprise a plurality of columns.

6. The electrothermal heater of claim 5 wherein each of the plurality of columns have a polygonal or circular cross-section.

7. The electrothermal heater of claim 1 wherein the plurality of support members comprise a plurality of ridges extending laterally across the mat.

8. The electrothermal heater of claim 1 wherein the plurality of support members comprise a plurality of pyramids.

9. An electrothermal heater for preventing the accumulation of ice on the skin of an aircraft, the electrothermal heater comprising:
    an electrothermal heating element;
    a heater skin layer disposed on a first side of the electrothermal heating element;
    a thermal insulation barrier layer disposed on a second side of the electrothermal heating element;
    wherein the heater skin layer is a non-structural, maintainable material; and
    wherein the thermal insulation barrier layer comprises a plurality of spaced-apart supports extending perpendicularly from the second side of the electrothermal heating element; and
    wherein the plurality of spaced-apart supports are disposed against the skin of the aircraft to maintain a layer of air between the electrothermal heating element and the skin of the aircraft.

10. The electrothermal heater of claim 9 wherein the layer of air is substantially trapped between the skin of the aircraft and the electrothermal heating element to reduce heat transfer from the electrothermal heating element to the skin of the aircraft.

11. The electrothermal heater of claim 1 wherein the layer of air is substantially trapped between the second sheet and the aircraft.

12. The electrothermal heater of claim 9 wherein condensation on the aircraft may drain through the layer of air between the plurality of spaced-apart supports.

13. The electrothermal heater of claim 1 wherein condensation on the aircraft may drain between the plurality of rigid support members of the thermal barrier.

14. The electrothermal heater of claim 10 wherein the heater skin layer is disposed away from the skin of the aircraft.

* * * * *